(12) United States Patent
Zhang et al.

(10) Patent No.: US 10,554,591 B2
(45) Date of Patent: Feb. 4, 2020

(54) TECHNIQUES FOR EFFICIENT MESSAGING CLIENT COMMUNICATION

(71) Applicant: Facebook, Inc., Menlo Park, CA (US)

(72) Inventors: Wei Zhang, Bellevue, WA (US); Lei Guang, Bellevue, WA (US); Shaoqian Yuan, Sammamish, WA (US); Pei Yue, Bellevue, WA (US); Shuangtiao Huang, Bellevue, WA (US); Vladimir Shubin, Kenmore, WA (US); Yanhong Ju, Redmond, WA (US); Qunshu Zhang, Sammamish, WA (US)

(73) Assignee: FACEBOOK, INC., Menlo Park, CA (US)

( * ) Notice: Subject to any disclaimer, the term of this patent is extended or adjusted under 35 U.S.C. 154(b) by 143 days.

(21) Appl. No.: 15/691,569

(22) Filed: Aug. 30, 2017

(65) Prior Publication Data

US 2019/0068528 A1    Feb. 28, 2019

(51) Int. Cl.
*H04L 29/06* (2006.01)
*H04L 12/58* (2006.01)
*H04L 29/08* (2006.01)
*H04W 12/06* (2009.01)

(52) U.S. Cl.
CPC ............ *H04L 51/04* (2013.01); *H04L 63/083* (2013.01); *H04L 67/145* (2013.01); *H04W 12/06* (2013.01)

(58) Field of Classification Search
CPC ..... H04L 51/04; H04L 63/083; H04L 67/145; H04W 12/06

USPC ............................................................ 726/4
See application file for complete search history.

(56) References Cited

U.S. PATENT DOCUMENTS

| | | | |
|---|---|---|---|
| 2009/0138558 A1* | 5/2009 | Benoit | G06Q 10/107 709/206 |
| 2010/0042573 A1* | 2/2010 | Wenig | G06F 9/54 706/47 |
| 2012/0197797 A1* | 8/2012 | Grigg | G06Q 20/1085 705/43 |
| 2012/0197798 A1* | 8/2012 | Grigg | G06Q 20/1085 705/43 |
| 2014/0157381 A1* | 6/2014 | Disraeli | G06F 21/31 726/7 |
| 2015/0089331 A1* | 3/2015 | Skerry | G06F 9/45533 714/799 |
| 2015/0127727 A1* | 5/2015 | Tseng | H04L 65/403 709/204 |
| 2016/0043983 A1* | 2/2016 | Bishop | H04L 51/16 709/206 |

(Continued)

*Primary Examiner* — Haresh N Patel

(57) ABSTRACT

Techniques for efficient messaging client communication are described. In one embodiment, an apparatus may comprise a client front-end component of a messaging server operative to receive a protocol connect packet from a messaging client, the protocol connect packet initiating a client authentication process with the messaging client; and receive a message package from the messaging client, the message package received during the client authentication process; a client authentication component operative to perform the client authentication process with the messaging client; and a client message queueing component operative to queue the message package in an authorization-holding message queue in response to the message package being received during the client authentication process. Other embodiments are described and claimed.

20 Claims, 11 Drawing Sheets

(56) References Cited

U.S. PATENT DOCUMENTS

| | | | |
|---|---|---|---|
| 2016/0053526 A1* | 2/2016 | Dittrich | E05G 1/04 |
| | | | 109/38 |
| 2016/0182464 A1* | 6/2016 | Mintz | H04L 63/0442 |
| | | | 713/170 |
| 2016/0226835 A1* | 8/2016 | Hamburger | H04L 51/36 |
| 2018/0191663 A1* | 7/2018 | Harpaz | G06F 16/9535 |

* cited by examiner

*Messaging System 100*

600

Receive a protocol connect packet from a messaging client at a messaging server, the protocol connect packet initiating a client authentication process with the messaging client.
*602*

Receive a message package from the messaging client at the messaging server, the message package received during the client authentication process.
*604*

Queue the message package in an authorization-holding message queue in response to the message package being received during the client authentication process.
*606*

_Prior Art_

TECHNIQUES FOR EFFICIENT MESSAGING CLIENT COMMUNICATION

BACKGROUND

Mobile devices may run applications, commonly known as "apps," on behalf of their users. These applications may execute as processes on a device. These application may engage in network activity on the mobile device, such as may use wireless signals, including Wi-Fi, cellular data, and/or other technologies.

Cellular carriers may provide cellular data communication to their cellular customers. For example, smart phones and other mobile devices may run web browsers that may be used while on the cellular network to retrieve web pages. Additionally, many applications that may be pre-installed or user-installed on a mobile device may use cellular data communication to access remote data, such as resources available on the Internet.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for efficient messaging client communication. In one embodiment, an apparatus may comprise a client front-end component of a messaging server operative to receive a protocol connect packet from a messaging client, the protocol connect packet initiating a client authentication process with the messaging client; and receive a message package from the messaging client, the message package received during the client authentication process; a client authentication component operative to perform the client authentication process with the messaging client; and a client message queueing component operative to queue the message package in an authorization-holding message queue in response to the message package being received during the client authentication process. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
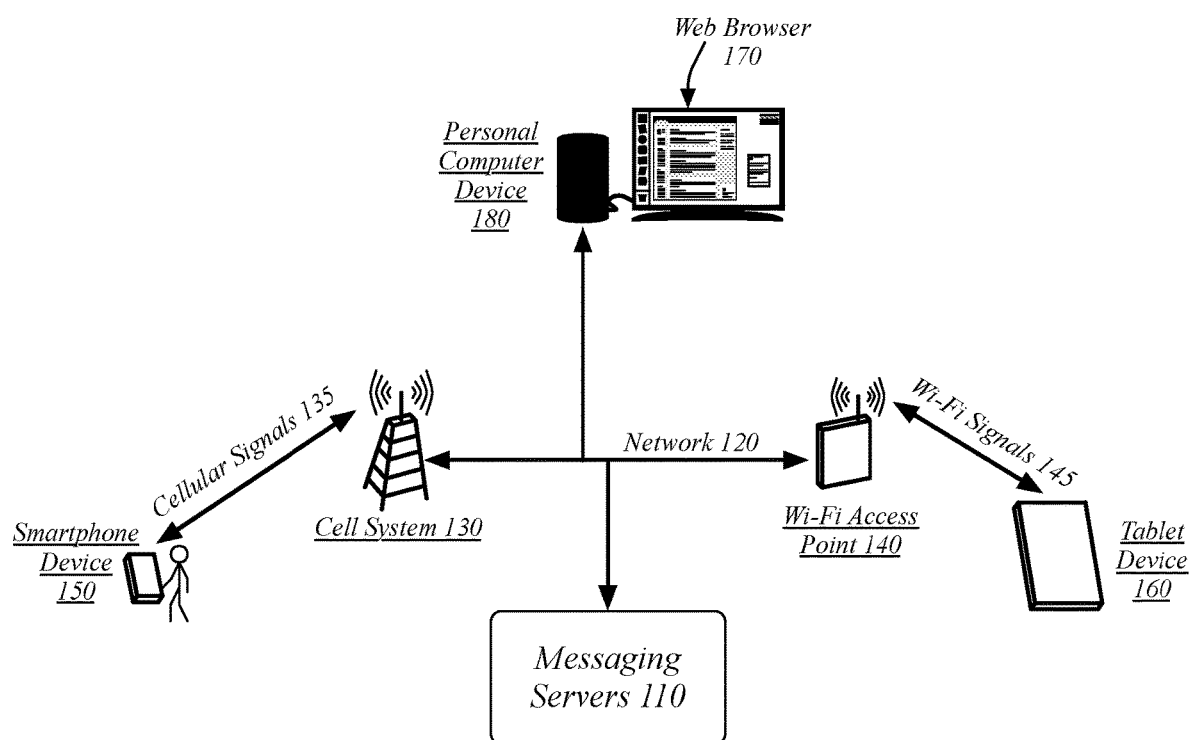
FIG. 1 illustrates an embodiment of a messaging system.

To empower a user's use of a messaging client, the messaging client may use the messaging server infrastructure of a messaging system. The messaging client connects to a messaging server, authenticates with the messaging system, and may thereafter make use of the messaging system. The messaging client sends messages, receives messages, receives notifications, subscribes and unsubscribes to topics, and generally engages in messaging activity.

The communication between the messaging client and the messaging server may be performed using a messaging protocol. This messaging protocol may specify formats for various interactions, including, without limitation, connection, disconnection, authentication, publishing, subscribing, and unsubscribing. In some embodiments, a messaging system may use an existing messaging protocol. In some embodiments, a messaging system may use a custom messaging protocol. In some embodiments, a messaging system may use a customized modification of an existing messaging protocol.

The messaging protocol for a messaging system may be designed to empower efficient communication. Efficiency may be measured according to a variety of factors. A messaging system may provide responsiveness to a user, in which user actions are empowered and carried out quickly. A messaging system may provide efficient network usage to a user, where the messaging system conserves usage of network resources, which may be of particular importance for mobile devices that use, at least some of the time, cellular networks. A messaging system may provide efficient power usage to a user, where the messaging system conserves usage of power resources, which may be of particular importance for mobile devices that operate on, at least some of the time, a battery. Providing efficiency on any or all of these metrics may provide a valuable messaging experience to a user of a messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging system 100. In one embodiment, the messaging system 100 may comprise a computer-implemented system having software applications comprising one or more components. Although the messaging system 100 shown in FIG. 1 has a limited number of elements in a certain topology, it may be appreciated that the messaging system 100 may include more or less elements in alternate topologies as desired for a given implementation.

The messaging servers 110 may comprise one or more messaging servers operated by a messaging system 100. A messaging server may comprise an Internet-accessible server, with the network 120 connecting the various devices of the messaging system 100 comprising, at least in part, the Internet. The messaging system 100 may be one component of a larger system that provides messaging services, as well as potentially other services, such as social-networking services.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same or a different user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same or a different user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging system 100 including the messaging servers 110. A dedicated messaging client may be a general client operative to work with a plurality of different messaging providers including the messaging provider administering the messaging system 100 including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a social networking service, with the computing device providing additional functionality of the social networking service. Similarly, a social networking application may provide both messaging functionality and additional functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. Messaging applications on different devices may comprise installations of the same application on both devices. Messaging applications on different devices may comprise smartphone-specific and tablet-specific versions of a common application. Messaging applications on different devices may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a inbox, a deletion of a message from a inbox, and a read receipt.

A messaging system 100 may operate by defining a messaging inbox as comprising a plurality of messages, wherein each message is an individual transaction of communication between two or more participants. A messaging server may operate by maintaining a message index for the messaging inbox. Messaging servers may receive messages and store the messages in message archives from which messages may be retrieved through reference to the message index. Messaging clients may connect to the messaging servers and retrieve messages that have been added to their message archive since their last update. The messaging clients may receive a message index from the message archive indicating what messages are stored in the message archive. The messaging clients may compare the message archive to their current inbox in order to determine what messages they are missing, which they then request from the message archive. The messaging clients may make changes to their inbox, which results in message inbox instructions being transmitted to the message archives instructing the message archives in modifications to make to the representation of their message inbox on the message archives.

Messaging interactions mediated by a messaging system 100 may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system 100 may use knowledge generated from interactions in between users. The messaging system 100 may comprise a component of a social-networking system and may use knowledge generated from the broader interactions of the social-networking system. As such, to protect the privacy of the users of the messaging system 100 and the larger social-networking system, messaging system 100 may include an authorization server (or other suitable component(s)) that allows users to opt in to or opt out of having their actions logged by the messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 100 and other elements of a social-networking system through blocking, data hashing, anonymization, or other suitable techniques as appropriate.

Figure 2:
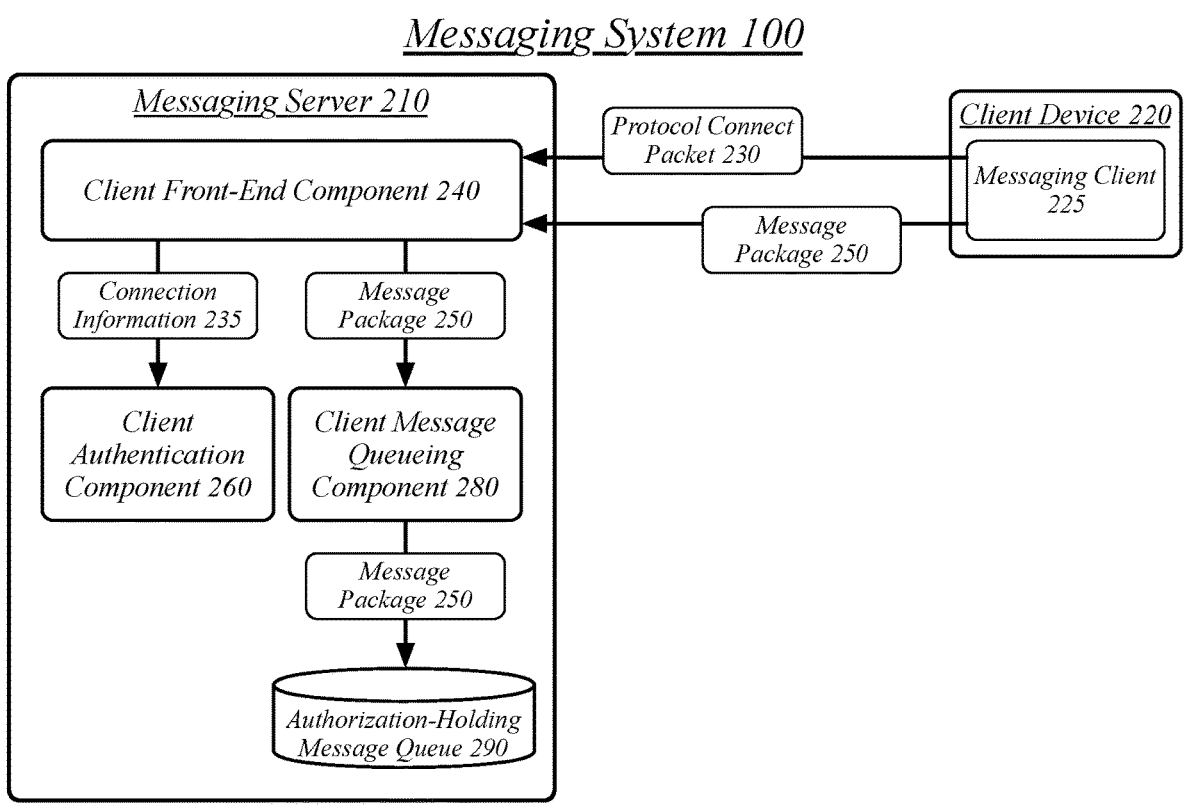
FIG. 2 illustrates an embodiment of the messaging system sending a message package during a client authentication process.

FIG. 2 illustrates an embodiment of the messaging system 100 sending a message package 250 during a client authentication process.

The messaging system 100 may comprise a plurality of components. The messaging system 100 may comprise a client front-end component 240, a client authentication component 260, and a client message queueing component 280, without limitation. In various embodiments, the components may comprise software and/or hardware elements.

In some embodiments, all of the plurality of components may execute as part of a messaging server 210. The messaging server 210 may execute on a messaging server device. The messaging server 210 may comprise one of the messaging servers 110 described with reference to FIG. 1. In some embodiments, the messaging system 110 may comprise multiple messaging servers 110. In some cases, each of a plurality of messaging servers 110 may each execute all of the described components, including the client front-end component 240, the client authentication component 260, and the client message queueing component 280. In other cases, different components may be executed in different messaging servers.

The client front-end component 240 communicates with a messaging client 225 executing on a client device 220. The messaging system 100 uses a messaging protocol for communication. The client front-end component 240 communicates with the messaging client 225 using the messaging protocol. The messaging protocol may comprise the message queue telemetry transport (MQTT) protocol. The client front-end component may communicate with the messaging client 225 using a modified MQTT protocol with a non-standard implementation, with the modifications improving the efficiency of the communication between the client front-end component 240 and messaging client 225.

The messaging system 100 may comprise a client front-end component 240. The client front-end component 440 is generally arranged to exchange information with client devices to empower the client devices to engage in messaging activity using a messaging system. The client front-end component 440 may comprise the point of contact for client devices with the messaging system 100.

The messaging system 100 may comprise a client authentication component 260. The client authentication component 260 is generally arranged to perform authentication operations for users of the messaging system 100 to authenticate—or reject authentication of—messaging clients on client devices. The client authentication component 260 may exchange authentication information with a messaging client 225 via the client front-end component 240 to determine whether the messaging client 225 should be authenticated with a user account for the messaging system 100. Other components of the messaging system 100 may be configured to perform various operations in response to a messaging client 225 being successfully authorized or the failure of a messaging client 225 to be authorized.

The messaging system 100 may comprise a client message queueing component 280. The client message queueing component 280 is generally arranged to perform the reception of messages from messaging clients and the queueing of messages for either temporary storage or for the distribution to other messaging clients. The client message queueing component 280 is operative to perform message queueing operations based on whether a client authentication process is in progress, has been successfully completed, or has failed.

The client front-end component 240 of a messaging server 210 is operative to receive a protocol connect packet 230 from a messaging client 225. The messaging client 225 sends the protocol connect packet 230 to initiate a connection process with the messaging server 210. The connection process may be initiated in response to a user activation the messaging client 225 on the client device 420.

The protocol connect packet 230 initiates a client authentication process with the messaging client 225 at the messaging server 210. The client authentication process is a process of information exchange in which the messaging client 225 attempts to provide authentication credentials establishing that the messaging client 225 is authorized to access the messaging system 100 on behalf of a user. The authorization credentials may comprise, without limitation, one or more of a secure token, login information, user identifier information, and password information.

The client front-end component 240 provides connection information 235 to the client authentication component 260. The connection information 235 may include information extracted from the protocol connection packet 230 and/or may include information determined based on information extracted from the protocol connection packet 230. The connection information 235 may comprise a user identifier, login information, or password for a user of the messaging client 225. The extracted information may comprise a secure token.

The client authentication component 260 is operative to perform the client authentication process with the messaging client 225 based on the connection information 235. The client authentication process may comprise a comparison of the connection information 235 with authentication information for a user identified in the protocol connect packet 230. The client authentication component 260 makes a determination based on the connection information 235 of whether the client authentication process is successful, such that the messaging client 225 is authenticated to access the messaging system 100 based on the protocol connect packet 230, or whether the client authentication process fails, such that the messaging client 225 is not authenticated to access the messaging system 100 based on the protocol connect packet 230.

The client front-end component 240 may further receive a message package 250 from the messaging client 255. Where a message package 250 is received during the client authentication process, the message package 250 is accepted, but is not yet distributed via the messaging system 100 as the messaging client 225 is only authorized to distribute messages via the messaging system 100 following a successful client authentication process. Instead, the message package 250 is stored locally in anticipation of a decision of whether or not the messaging client 225 is successfully authenticated.

Messaging clients may be empowered to send messaging packages for local queueing in order to improve the efficiency of use of the messaging system 100 by the messaging client 225. The client authentication process may comprise a series of steps: the messaging client 225 sending the protocol connect packet 230 to the client front-end component 240 over a network, the client front-end component 240 providing connection information 235 to the client authentication component 260, the client authentication component 260 successfully authenticating the messaging client 225, the client authentication component 260 informing the client front-end component 240 that the authentication was successful, and the client front-end component 240 then sending a protocol connect acknowledgment to the messaging client 225.

Each of these steps of processing and/or communication may take time, during which the messaging client 225 has requested authentication but has not yet received notice of successful authentication. During this window of waiting time, the messaging client 225 may be executing, using processor and power resources. The processing hardware of the client device 220 may be in a higher-power state to allow for application execution and network activity, using power resources. A cellular, Wi-Fi, or other network radio device may be active to perform network activity, using power resources. If the messaging client 225 sends messages, such as in a message package 250, to the client front-end component 240 during the client authentication process, the message sending may be performed without drawing additional power, or with only drawing a small amount of additional power, over what would be used to make possible the sending of the protocol connect packet 230.

By sending the message package 250, and possibly additional messages, during this time, the messaging client 225 may complete at least a portion of its message-sending prior to the completion of the client authentication process. As such, the active period for a processor, radio device, or other hardware of the client device 220 may be reduced by reducing the time used by the messaging client 225 to engage in network-based messaging activity. This may, in turn, reduce the power used by the client device 220, improving the power efficiency of the messaging client 225 on the client device 220.

Further, by sending the message package 250, and possibly additional messages, during this time, the messaging client 225 may begin message submission more quickly—as compared to if it had waited until the conclusion of the client authentication process—and thereby be perceived as more responsive to its user. As such, the messaging client 225 may both reduce power usage and improve responsiveness.

The client front-end component 240 provides the message package 250 to the client message queueing component 280. The client message queueing component 280 is operative to queue the message package 250 in an authorization-holding message queue 290 in response to the message package 250 being received during the client authentication process. The client message queueing component 280 will not submit the message package 250 for distribution and delivery through the messaging system 100 without the messaging client 225 having been successfully authenticated. Instead, it will locally queue the message package 250 for distribution through the messaging system 100 in anticipation of the successful completion of the client authentication process. Where multiple message packages are received from the messaging client 225, the message packages are queued in the order they were received, so that they may be forwarded—if the messaging client authentication is successful—in the order they were received.

As the messaging server 210 may execute on a messaging server device, the authorization-holding message queue 290 may be a memory queue local to the messaging server device. Each messaging client in the process of connecting to the client front-end component 240 may have its own temporary memory queue instantiated if it submits a message package to the client front-end component 240 during the client authentication process. This temporary memory queue is then destroyed when it is no longer useful, either because the client authentication process failed, or because the client authentication process succeeded and the temporary memory queue was emptied of message packages in response.

Figure 3:
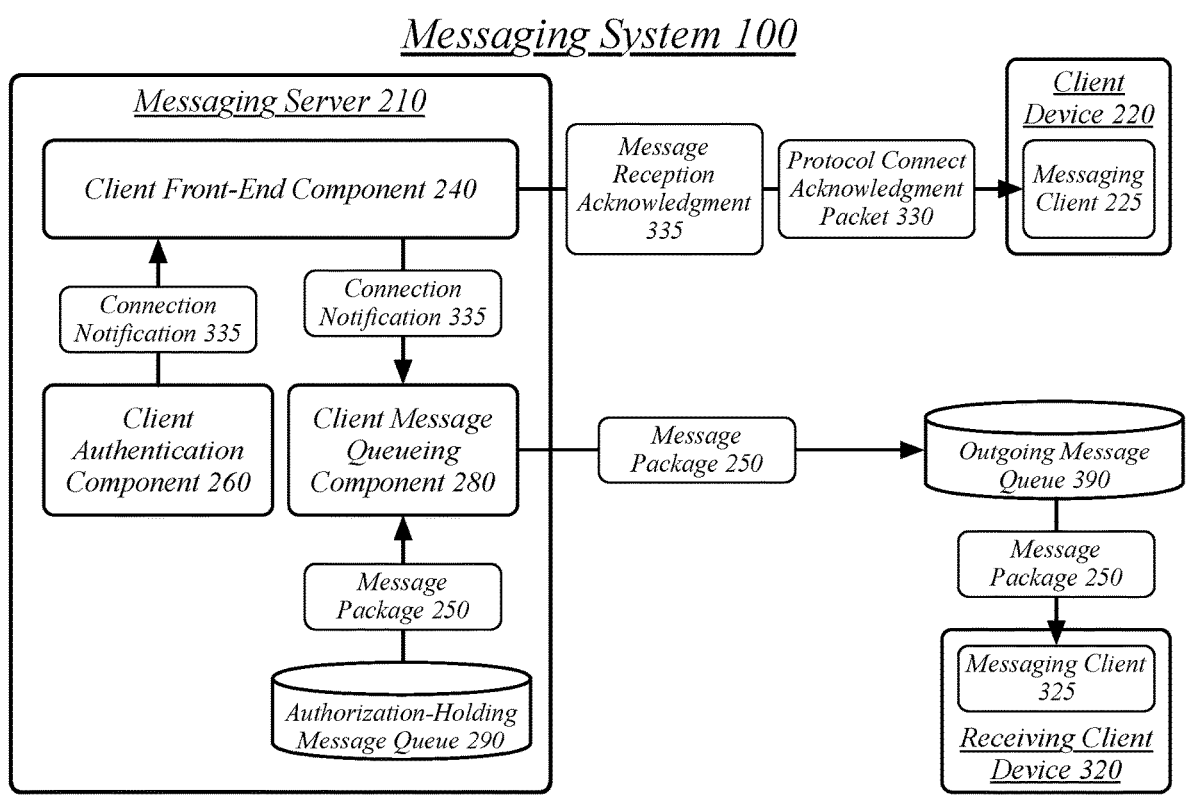
FIG. 3 illustrates an embodiment of the messaging system forwarding a message package in response to a successful client authentication.

FIG. 3 illustrates an embodiment of the messaging system 100 forwarding a message package 250 in response to a successful client authentication.

The messaging system 100 includes an outgoing message queue 390. The outgoing message queue 390 may be, without limitation, a global message queue, a user-specific message queue, a messaging-conversation-specific message queue, a message-thread-specific message queue, or a message queue handling the distribution of messages of any other type.

The client authentication component 260 may determine that the protocol connect packet 230 authenticates the messaging client 225 for a user account. The client authentication component 260 then provides a connection notification 335 to the client front-end component 240 and client message queueing component 280 to indicate that the client authentication process was successful for the messaging client 225 for the user account. The client authentication component 260 completes the client authentication process with the messaging client as a successful authentication, which may include instructing the client front-end component 240 to send a protocol connect acknowledgement packet 330 to the messaging client 225. The client front-end component 240 sends the protocol connect acknowledgement packet 330 to the messaging client 225, informing the messaging client 225 that it has successfully authenticated and that it is therefore authorized to engage in messaging operations with the messaging system 100.

The client message queueing component 280 receives the connection notification 335 and forwards the message package 250 from the authorization-holding message queue 290 to the outgoing message queue 390 in response to the successful authentication. Where a plurality of message packages are received from the messaging client 225, the plurality of message packages are queued in the authorization-holding message queue 290. This plurality of message packages are then iteratively extracted from the authorization-holding message queue 290 and submitted to the outgoing message queue 390.

The messaging system 100 uses the outgoing message queue 390 to forward a message package 250 to at least one other messaging client 325 on a receiving client device 320. The receiving client device 320 is determined based on the delivery information for the message package 250. The receiving client device 320 may comprise a client device associated with the same user as the sending client device 220, such that the message is replicated between multiple client devices for a particular user. Alternatively or additionally, the message package 250 may be delivered to a receiving client device 320 belonging to another user, such as where the message package 250 is addressed to a messaging conversation with another user, such as by being composed in a message thread with that other user. The message package 250 is delivered to the messaging client 325 of the receiving client device 320 based on the configuration of the message package 250 by the sending message client 225.

The client message queueing component 280 sends a message reception acknowledgement 335 for the message package 250 to the messaging client 225 in response to forwarding the message package 250 from the authorization-holding message queue 290 to the outgoing message queue 390 based on the successful authentication. The messaging client 225 uses the message reception acknowledgement 335 to mark the message package 250 as having been received by the messaging system 100 and therefore not needing retry or other follow-up processing by the messaging client 225 to ensure delivery. The messaging client 225 may display a message reception acknowledgement symbol in association with a message sent via the message package 250 in a messaging interface based on the message reception acknowledgement 335 to indicate to the user of the messaging client 225 that the message has been sent to the messaging system 100 and is therefore being distributed to various other users. Additional delivery indicators may be displayed in some embodiments, such as delivery indicators indicating delivery to a receiving client device for an addressed user, actual viewing by an addressed user, or other indicators of message status.

While the messaging server 210 may execute on a messaging server device, with the authorization-holding message queue 290 a memory queue local to the messaging server device, the outgoing message queue 390 may be a network-accessible queue non-local to the messaging server device. In contrast to the local authorization-holding message queue 290, the outgoing message 390 may be hosted and/or stored on other devices as part of a distributed server architecture for the messaging system 100. The authorization-holding message queue 290 may be stored locally in the memory of the messaging server device due to its small size and temporary nature.

In some cases, the client authentication component 260 may determine a failed authentication for the client authentication process with the messaging client. For instance, the protocol connect packet 230 may contain improper, invalid, inadequate, or other unsatisfactory. The client authentication component 260 notifies the client front-end component 240 of the failed authentication, so that it may be communicated to the messaging client 225. In some embodiments, the client front-end component 240 may close the network connection to the messaging client 225 in response to the failed authentication. In other embodiments, the client front-end component 240 may notify the messaging client 225 of the failed authentication but leave the network connection open for a potential retry of the authentication attempt. The client front-end component 240 may provide error messages to the messaging client 225 relating to the failed authentication.

The client authentication component 260 notifies the client message queueing component 280 of the failed authentication. The client message queueing component 280 then deletes the message package 250 from the authorization-holding message queue 290 in response to the failed authentication without forwarding the message package 250 to the outgoing message queue 390. Where multiple message packages were received from the messaging client 225 during the client authentication process, the multiple message packages are all deleted from the authorization-holding message queue 290 in response to the failed authentication without forwarding the message packages to the outgoing message queue 390.

Figure 4:
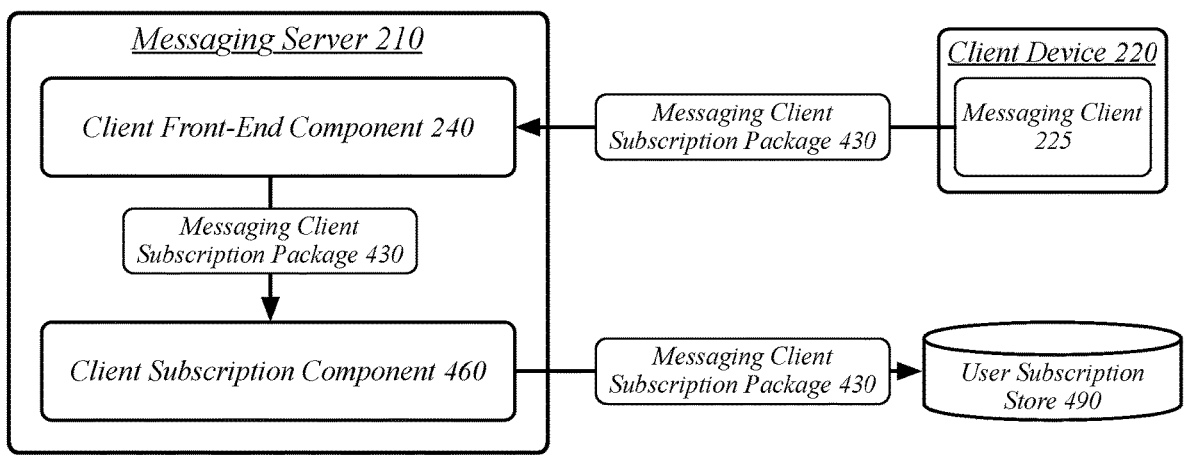
FIG. 4 illustrates an embodiment of the messaging system processing a messaging client subscription package.

FIG. 4 illustrates an embodiment of the messaging system 100 processing a messaging client subscription package 430.

The messaging system 100 may comprise a client subscription component 460. The client subscription component 460 may execute on the messaging server 210. The client subscription component 460 is generally arranged to manage client subscriptions on behalf of messaging clients on client devices.

The messaging client 225 may submit a messaging client subscription package 430 to the client front-end component 240. The messaging client subscription package 430 comprising one or more subscription requests. A subscription request modifies the list of topics to which a user account and/or messaging client 225 are subscribed.

The client front-end component 240 receives the messaging client subscription package 430 from the messaging client 225 and provides to a client subscription component 460. The client subscription component 460 then performs a modification of the subscriptions for the user account and/or messaging client 225 with a user subscription store 490 based on the messaging client subscription package 430. The user subscription store 490 comprises a table of user subscriptions and is used by the messaging system 100 to determine the recipients of subscription-based messages, updates, notifications, and other communication.

Subscriptions may be to a variety of different topics. Users may subscribe to topics for which they would like to receive updates, as may relate to news, sports, or other topics of personal interest. Such a subscription may be performed using a messaging client subscription package 430 that specifies one or more topics that the user has requested to subscribe to.

Subscriptions may be used to register a client device 220 to receive updates on particular topics used by the messaging client 225 to generate user notifications or other display elements. In one embodiment, a messaging system 100 may have a predefined set of foreground notification subscriptions and a predefined set of background notification subscriptions. The predefined set of foreground notification subscriptions may include a contact status subscription subscribing the messaging client 225 to updates to the status of contacts or friends for the user account the messaging client 225 is authenticated with. The predefined set of background notification subscriptions may exclude this contact status subscription. In general, the predefined set of background notification subscriptions may be a subset of the predefined set of foreground notification subscriptions.

The messaging system 100 may detect that an event to which the messaging client 225 is subscribed has occurred. The messaging system 100 may receive a broadcast message on a topic to which the messaging client 225 is subscribed. In either case, a notification message is sent to the messaging client 225 based on the subscription of the messaging client 225 or user account to the topic. For example, a foreground-relevant event may be detected, such as a contact of the user account changing its status (e.g., the contact has come offline, the contact has gone offline). The notification message is sent to the messaging client 225 and a display of the contact's status is determined based on the notification message. Similarly, a background-relevant event may be detected, such as the user account receiving a message, for which a notification is sent to the client device 220, possibly waking it up to display the notification.

The client front-end component 240 may receive the messaging client subscription package 430 as part of the protocol connect packet 230. The messaging client subscription package 430 may be contained within the data payload of the protocol connect packet 230. In these cases, the messaging client subscription package 430 may comprise a plurality of subscription topics for foreground messaging client notification or background messaging client notification, depending on the messaging client 225 foreground or background status. Alternatively, the messaging client subscription package 430 may indicate that a predefined set of foreground notification subscriptions or background notification subscriptions should be used.

The client front-end component 240 may receive a messaging client subscription package 430 after a successful authentication. The messaging client subscription package 430 may comprise a plurality of subscription topics for background messaging client notification. Alternatively, the messaging client subscription package 430 may indicate that a predefined set of background notification subscriptions should be used.

Where an existing messaging protocol is used, the use of the messaging protocol by the messaging system 100 may be different than the messaging protocol as specified. For instance, the messaging protocol may support both a subscription-message template type and a publish-message template type. However, the subscription-message template type may only support a single subscription addition or removal per message, such as where the messaging protocol comprises the message queue telemetry transport (MQTT) protocol. As such, the messaging system 100 may overload the publish-message template type for subscriptions instead of using the subscription-message template type.

A messaging client subscription package 430 may correspond to a publish-message template type for a messaging protocol. The publish-message template type comprises a topic field and a payload field. The messaging client subscription package 430 comprises a subscription-type topic for the topic field. The use of a subscription-type topic for the topic field is distinct from the use of a subscription-message template type. Instead, the use of the subscription-type topic for the topic field indicates to the messaging system 100 that the payload field should be interpreted as a list of subscribe and unsubscribe commands. The messaging client subscription package 430 therefore comprises a subscription list of the plurality of subscription topics for the payload field. As such, multiple subscribe and/or unsubscribe commands may be specified in a single message package.

Enumeration integers may be used to specify the subscription topics. The available subscription topics may be enumerated as integers to produce a compact form for representing subscription topics. The subscription list of the plurality of subscription topics may therefore comprise a list of enumeration integers for the plurality subscription topics. The list of enumeration integers may therefore comprise a binary data payload.

Figure 5:
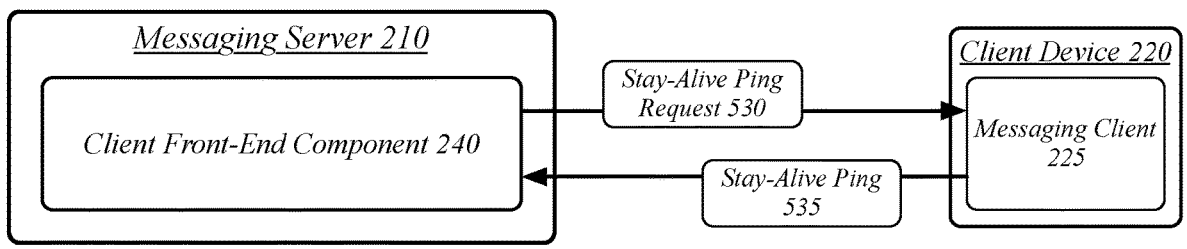
FIG. 5 illustrates an embodiment of the messaging system maintaining a connection to a messaging client.

FIG. 5 illustrates an embodiment of the messaging system 100 maintaining a connection to a messaging client 225.

The client front-end component 240 and messaging client 225 may operate to keep alive a network connection between the two of them. Keeping the connection alive may comprise the messaging client 225 periodically notifying the client front-end component 240 that it is still available over the network connection: that the client device 220 is powered on (though not necessarily in an active mode) and connected to a network.

In some embodiments, the messaging client 225 periodically sends a stay-alive ping 535 to the client front-end component 240 that it is still available. The client front-end component 240 responds to a stay-alive ping 535 by resetting a timeout timer for the messaging client 225. If the timeout timer expires, the network connection with the messaging client 225 is closed. The messaging system 100 may further use the status of the network connection between the messaging client 225 and the client front-end component 240 to inform a user account status, such as to indicate whether the user account is online or not. The user account status may be displayed on client devices of messaging contacts of the user account.

The client front-end component 240 may send a stay-alive ping request 530 to the messaging client 225. The stay-alive ping request 530 is a request by the client front-end component 240 that the messaging client 225 send a stay-alive ping 535 back to the client front-end component 240. The stay-alive ping request 530 may be sent in response to the expiration of a stay-alive ping request timer. The stay-alive ping request timer may be reset when the stay-alive ping 535 is received.

The client front-end component 240 may also reset a stay-alive ping request timer associated with the messaging client 225 at the messaging server 210 in response to receiving the message package 250. This may save the client device 220 from being woken up by a stay-alive ping request 530 by delaying the time until the stay-alive ping request 530 is sent. The stay-alive ping request timer may be reset whenever any communication is received from the messaging client 225, thereby reducing the number of times or the probability of the client front-end component 240 waking up a client device 220 with a stay-alive ping 535, and thereby using processor, network, and power resources of the client device 220.

In some embodiments, the messaging client 225 may send a stay-alive ping 535 earlier than a stay-alive ping timer would indicate in order to reduce power usage. The client front-end component 240 may receive a stay-alive ping from the messaging client 225 where the stay-alive ping is sent based on a client device screen activation for the client device 220 executing the messaging client 225. The client device screen activation may be performed for any reason, such as a user activation or an application activation. The messaging client 225 may subscribe with an operating system of the client device 220 to being notified of the client device screen activation and send the stay-alive ping 535 in response. The client front-end component 240 then resets the stay-alive ping request timer associated with the messaging client 225 in response to receiving the stay-alive ping 535. This serves to delay the time until a stay-alive ping request 530 is sent to the messaging client 525 by the client front-end component 240.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a protocol connect packet from a messaging client at a messaging server, the protocol connect packet initiating a client authentication process with the messaging client at block 602.

The logic flow 600 may receive a message package from the messaging client at the messaging server, the message package received during the client authentication process at block 604.

The logic flow 600 may queue the message package in an authorization-holding message queue in response to the message package being received during the client authentication process at block 606.

The embodiments are not limited to this example.

Figure 7:
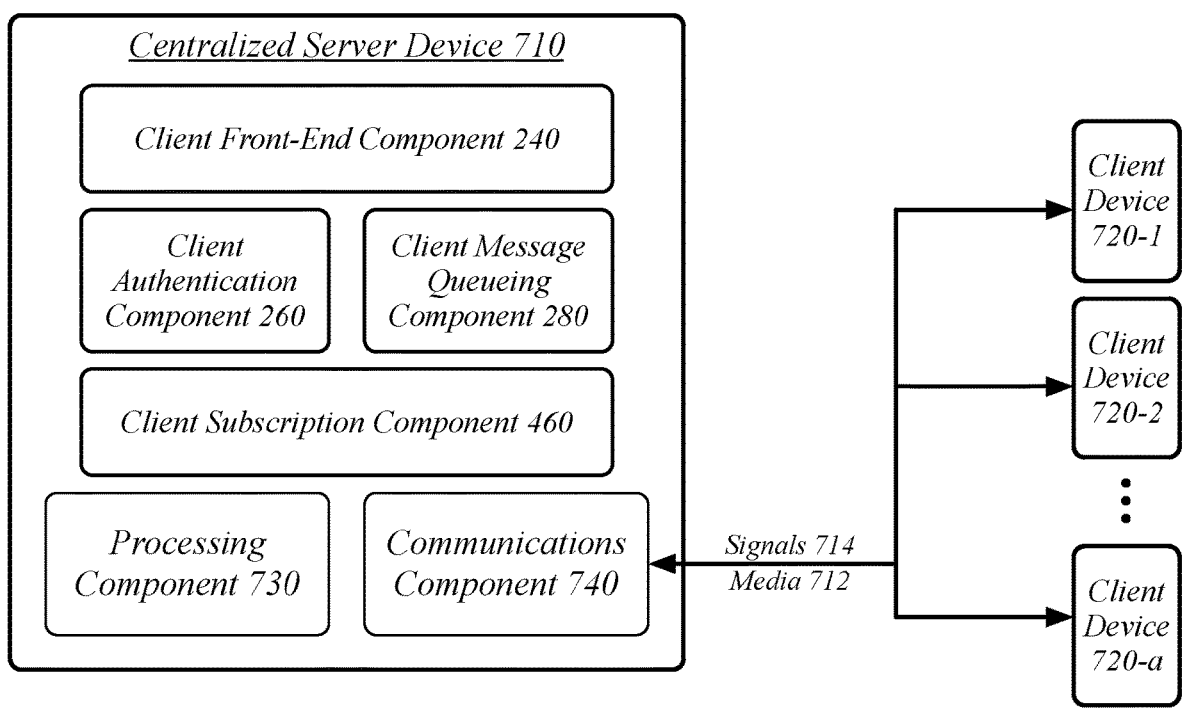
FIG. 7 illustrates an embodiment of a centralized system for the system of FIG. 1.

FIG. 7 illustrates a block diagram of a centralized system 700. The centralized system 700 may implement some or all of the structure and/or operations for the messaging system 100 in a single computing entity, such as entirely within a single centralized server device 710.

The centralized server device 710 may comprise any electronic device capable of receiving, processing, and sending information for the messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 710 may execute processing operations or logic for the messaging system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 710 may execute communications operations or logic for the messaging system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 710 may comprise a messaging server device executing a messaging server. The centralized server device 710 may execute the client front-end component 240, client authentication component 260, client message queueing component 280, and client subscription component 460. The centralized server device 710 may have the authorization-holding message queue 290 as a local memory queue. In various embodiments, the outgoing message queue 390 may be a local queue or a network-accessible queue. The centralized server device 710 may communicate with client devices 720 over a communications media 712 using communications signals 714 via the communications component 740. The client devices 720 may include the client device 220. Each of the client device 720 may execute a messaging client.

Figure 8:
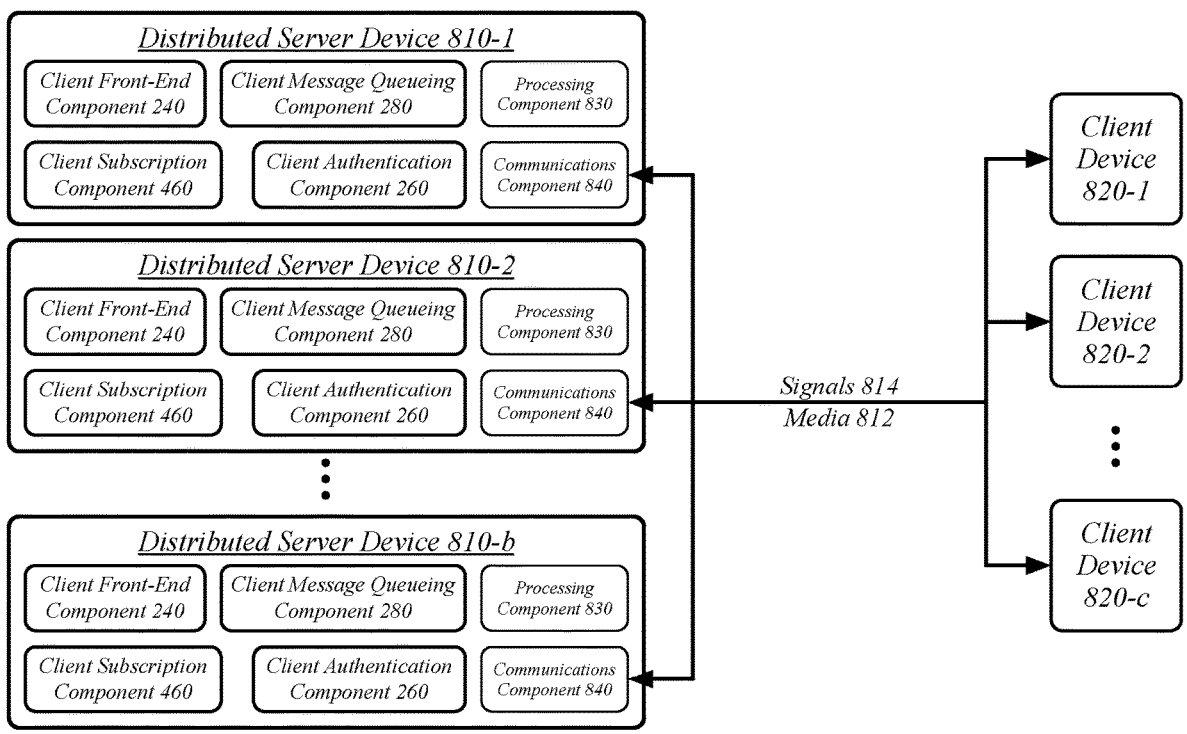
FIG. 8 illustrates an embodiment of a distributed system for the system of FIG. 1.

FIG. 8 illustrates a block diagram of a distributed system 800. The distributed system 800 may distribute portions of the structure and/or operations for the messaging system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 810. In general, the distributed server devices 810 may be the same or similar to the centralized server device 710 as described with reference to FIG. 7. For instance, the distributed server devices 810 may each comprise a processing component 830 and a communications component 840 which are the same or similar to the processing component 730 and the communications component 740, respectively, as described with reference to FIG. 7. In another example, the distributed server devices 810 may communicate over a communications media 812 using communications signals 814 via the communications components 840.

The distributed server devices 810 may comprise a messaging server device executing a messaging server. The distributed server devices 810 may each execute the client front-end component 240, client authentication component 260, client message queueing component 280, and client subscription component 460. In other embodiments, different distributed server devices may execute different components. For instance, a client subscription component 460 may execute on a different distributed server device than the client front-end component 240, with the client front-end component 240 and client subscription component 460 communicating over the media 812 using signals 814. In different embodiments different arrangements and assignments of components to server devices may be used.

The distributed server devices 810 may each have the authorization-holding message queue 290 as a local memory queue. The outgoing message queue 390 may, in contrast, be a network-accessible queue. The distributed server devices 810 may communicate with client devices 820 over a communications media 812 using communications signals 814 via the communications components 840. The client devices 820 may include the client device 220. Each of the client device 820 may execute a messaging client.

Figure 9:
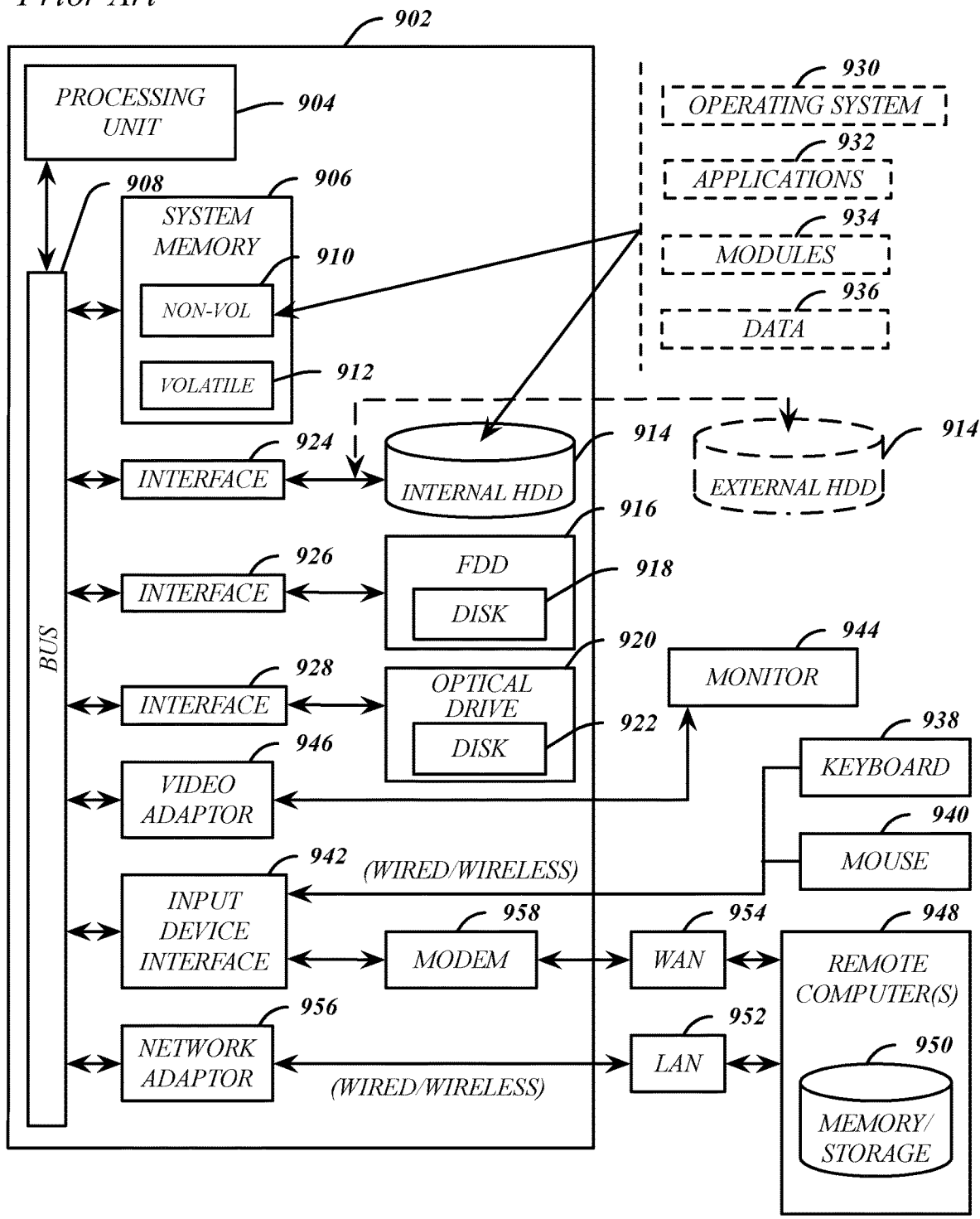
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIGS. 7 and 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the messaging system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
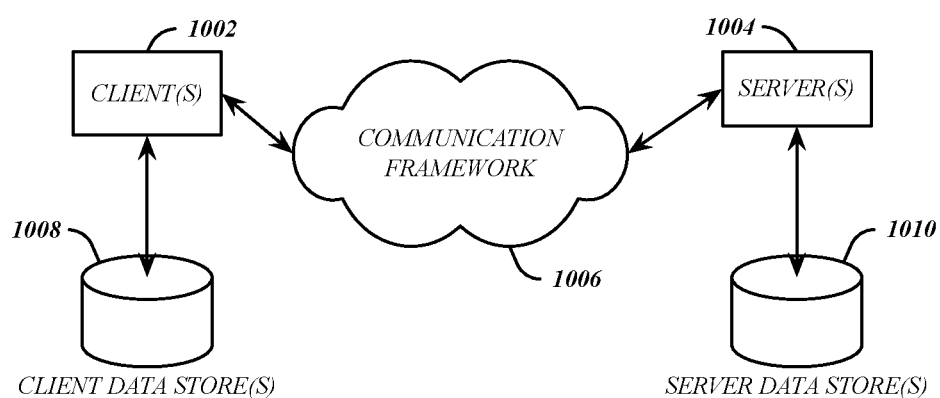
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may correspond to the messaging clients. The servers 1004 may correspond to one or more messaging servers. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
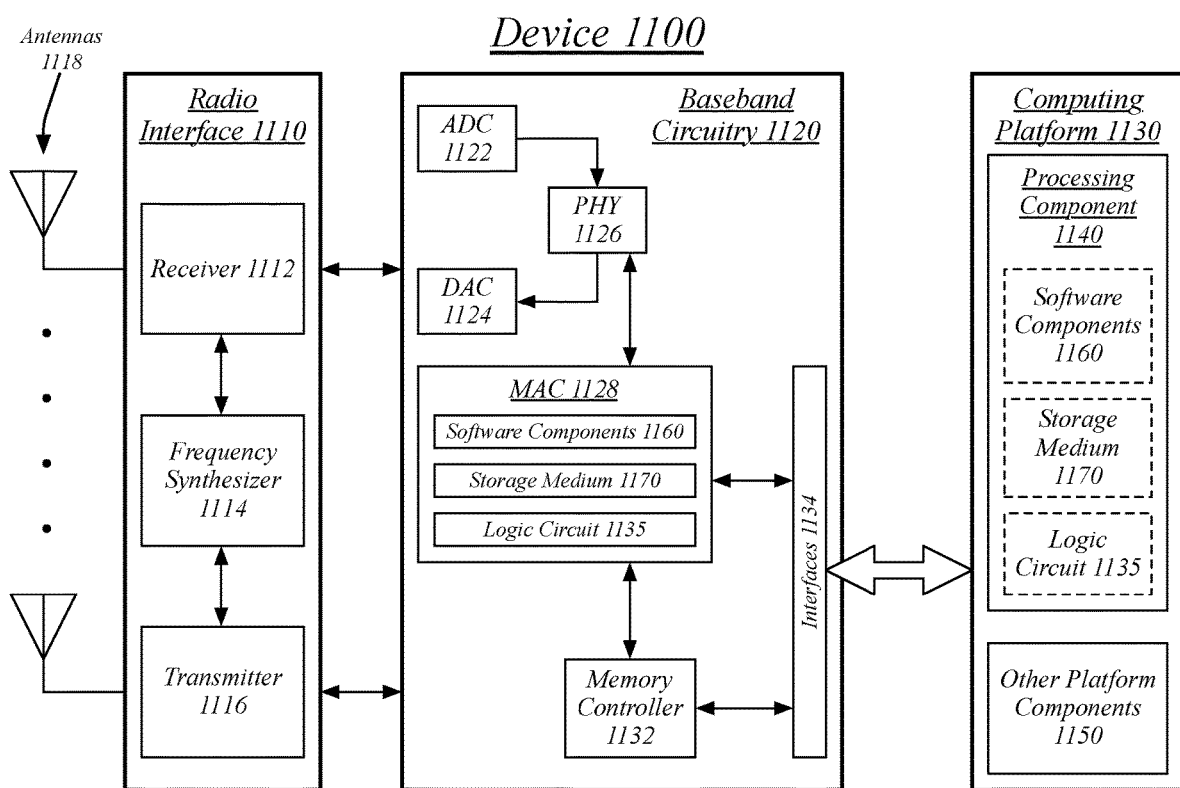
FIG. 11 illustrates an embodiment of a radio device architecture.

FIG. 11 illustrates an embodiment of a device 1100 for use in a multicarrier OFDM system, such as the messaging system 100. Device 1100 may implement, for example, software components 1160 as described with reference to messaging system 100 and/or a logic circuit 1135. The logic circuit 1135 may include physical circuits to perform operations described for the messaging system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the messaging system 100 and/or logic circuit 1135 in a single computing entity, such as entirely within a single device. Alternatively, the device 1100 may distribute portions of the structure and/or operations for the messaging system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the messaging system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a protocol connect packet from a messaging client at a messaging server, the protocol connect packet initiating a client authentication process with the messaging client; receiving a message package from the messaging client at the messaging server, the message package received during the client authentication process; and queueing the message package in an authorization-holding message queue in response to the message package being received during the client authentication process.

A computer-implemented method may further comprise completing the client authentication process with the messaging client as a successful authentication; and forwarding the message package from the authorization-holding message queue to an outgoing message queue in response to the successful authentication.

A computer-implemented method may further comprise sending a message reception acknowledgement for the message package to the messaging client in response to forwarding the message package from the authorization-holding message queue to the outgoing message queue based on the successful authentication.

A computer-implemented method may further comprise the messaging server executing on a messaging server device, the authorization-holding message queue a memory queue local to the messaging server device, the outgoing message queue a network-accessible queue non-local to the messaging server device.

A computer-implemented method may further comprise determining a failed authentication for the client authentication process with the messaging client; and deleting the message package from the authorization-holding message queue in response to the failed authentication.

A computer-implemented method may further comprise receiving a messaging client subscription package as part of the protocol connect packet, the messaging client subscription package comprising a plurality of subscription topics for foreground messaging client notification.

A computer-implemented method may further comprise receiving a messaging client subscription package after the successful authentication, the messaging client subscription package comprising a plurality of subscription topics for background messaging client notification.

A computer-implemented method may further comprise the messaging client subscription package corresponding to a publish-message template type for a messaging protocol, the publish-message template type comprising a topic field and a payload field, the messaging client subscription package comprising a subscription-type topic for the topic field, the messaging client subscription package comprising a subscription list of the plurality of subscription topics for the payload field.

A computer-implemented method may further comprise the messaging protocol comprising the message queue telemetry transport (MQTT) protocol.

A computer-implemented method may further comprise the subscription list of the plurality of subscription topics comprising a list of enumeration integers for the plurality subscription topics, the list of enumeration integers comprising a binary data payload.

A computer-implemented method may further comprise resetting a stay-alive ping request timer associated with the messaging client at the messaging server in response to receiving the message package.

A computer-implemented method may further comprise receiving a stay-alive ping from the messaging client at the messaging server, the stay-alive ping sent based on a client device screen activation for a client device executing the messaging client; and resetting a stay-alive ping request timer associated with the messaging client at the messaging server in response to receiving the stay-alive ping.

An apparatus may comprise a client front-end component of a messaging server operative to receive a protocol connect packet from a messaging client, the protocol connect packet initiating a client authentication process with the messaging client; and receive a message package from the messaging client, the message package received during the client authentication process; a client authentication component operative to perform the client authentication process with the messaging client; and a client message queueing component operative to queue the message package in an authorization-holding message queue in response to the message package being received during the client authentication process. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus.

Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a protocol connect packet from a messaging client at a messaging server, the protocol connect packet initiating a client authentication process for a messaging system with the messaging client, wherein the client authentication process is based on connection information extracted from the protocol connect packet;
receiving a message package at the messaging server, wherein the message packet is from the messaging client and for distribution via the messaging system, the message package received during the client authentication process; and
queueing the message package in an authorization-holding message queue in response to the message package being received during the client authentication process.

2. The method of claim 1, further comprising:
completing the client authentication process with the messaging client as a successful authentication; and
forwarding the message package from the authorization-holding message queue to an outgoing message queue in response to the successful authentication.

3. The method of claim 2, further comprising:
sending a message reception acknowledgement for the message package to the messaging client in response to forwarding the message package from the authorization-holding message queue to the outgoing message queue based on the successful authentication.

4. The method of claim 1, further comprising:
determining a failed authentication for the client authentication process with the messaging client; and
deleting the message package from the authorization-holding message queue in response to the failed authentication.

5. The method of claim 1, further comprising:
receiving a messaging client subscription package as part of the protocol connect packet, the messaging client subscription package comprising a plurality of subscription topics for foreground messaging client notification.

6. The method of claim 1, further comprising:
resetting a stay-alive ping request timer associated with the messaging client at the messaging server in response to receiving the message package.

7. The method of claim 1, further comprising:
receiving a stay-alive ping from the messaging client at the messaging server, the stay-alive ping sent based on a client device screen activation for a client device executing the messaging client; and
resetting a stay-alive ping request timer associated with the messaging client at the messaging server in response to receiving the stay-alive ping.

8. An apparatus, comprising:
a hardware processor;
a client front-end component of a messaging server operative to receive a protocol connect packet from a messaging client, the protocol connect packet initiating a client authentication process for a messaging system with the messaging client, wherein the client authentication process is based on connection information extracted from the protocol connect packet; and receive a message package from the messaging client for distribution via the messaging system, the message package received during the client authentication process;
a client authentication component operative to perform the client authentication process with the messaging client; and
a client message queueing component operative to queue the message package in an authorization-holding message queue in response to the message package being received during the client authentication process.

9. The apparatus of claim 8, further comprising:
the client authentication component operative to complete the client authentication process with the messaging client as a successful authentication; and
the client message queueing component operative to forward the message package from the authorization-holding message queue to an outgoing message queue in response to the successful authentication.

10. The apparatus of claim 9, further comprising:
the client front-end component operative to send a message reception acknowledgement for the message package to the messaging client in response to the forwarding of the message package from the authorization-holding message queue to the outgoing message queue based on the successful authentication.

11. The apparatus of claim 8, further comprising:
the client authentication component operative to determine a failed authentication for the client authentication process with the messaging client; and
the client message queueing component operative to delete the message package from the authorization-holding message queue in response to the failed authentication.

12. The apparatus of claim 8, further comprising:
the client front-end component operative to receive a messaging client subscription package as part of the protocol connect packet, the messaging client subscription package comprising a plurality of subscription topics for foreground messaging client notification.

13. The apparatus of claim 8, further comprising:
the client front-end component operative to reset a stay-alive ping request timer associated with the messaging client at the messaging server in response to receiving the message package.

14. The apparatus of claim 8, further comprising:
the client front-end component operative to receive a stay-alive ping from the messaging client at the messaging server, the stay-alive ping sent based on a client device screen activation for a client device executing the messaging client; and reset a stay-alive ping request timer associated with the messaging client at the messaging server in response to receiving the stay-alive ping.

15. At least one non-transitory computer-readable storage medium comprising instructions that, when executed, cause a system to:
receive a protocol connect packet from a messaging client at a messaging server, the protocol connect packet initiating a client authentication process for a messaging system with the messaging client, wherein the client authentication process is based on connection information extracted from the protocol connect packet;
receive a message package at the messaging server, wherein the message packet is from the messaging client and for distribution via the messaging system, the message package received during the client authentication process; and
queue the message package in an authorization-holding message queue in response to the message package being received during the client authentication process.

16. The at least one non-transitory computer-readable storage medium of claim 15, comprising further instructions that, when executed, cause a system to:
complete the client authentication process with the messaging client as a successful authentication;
forward the message package from the authorization-holding message queue to an outgoing message queue in response to the successful authentication; and
send a message reception acknowledgement for the message package to the messaging client in response to forwarding the message package from the authorization-holding message queue to the outgoing message queue based on the successful authentication.

17. The at least one non-transitory computer-readable storage medium of claim 15, comprising further instructions that, when executed, cause a system to:
determine a failed authentication for the client authentication process with the messaging client; and
delete the message package from the authorization-holding message queue in response to the failed authentication.

18. The at least one non-transitory computer-readable storage medium of claim 15, comprising further instructions that, when executed, cause a system to:
receive a messaging client subscription package as part of the protocol connect packet, the messaging client subscription package comprising a plurality of subscription topics for foreground messaging client notification.

19. The at least one non-transitory computer-readable storage medium of claim 15, comprising further instructions that, when executed, cause a system to:
reset a stay-alive ping request timer associated with the messaging client at the messaging server in response to receiving the message package.

20. The at least one non-transitory computer-readable storage medium of claim 15, comprising further instructions that, when executed, cause a system to:
receive a stay-alive ping from the messaging client at the messaging server, the stay-alive ping sent based on a client device screen activation for a client device executing the messaging client; and
reset a stay-alive ping request timer associated with the messaging client at the messaging server in response to receiving the stay-alive ping.

* * * * *